Feb. 11, 1936.    J. J. GALLIGAN ET AL    2,030,746
CRINKLED SHEET MATERIAL AND METHOD OF MAKING SAME
Filed Aug. 18, 1934
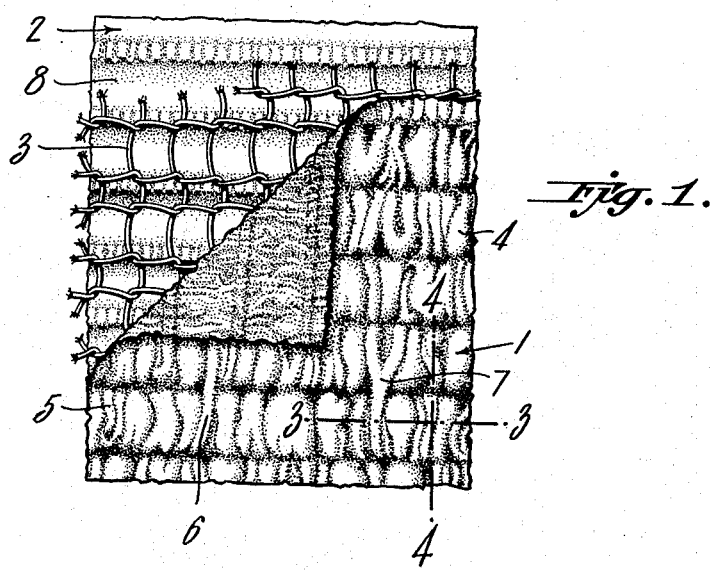
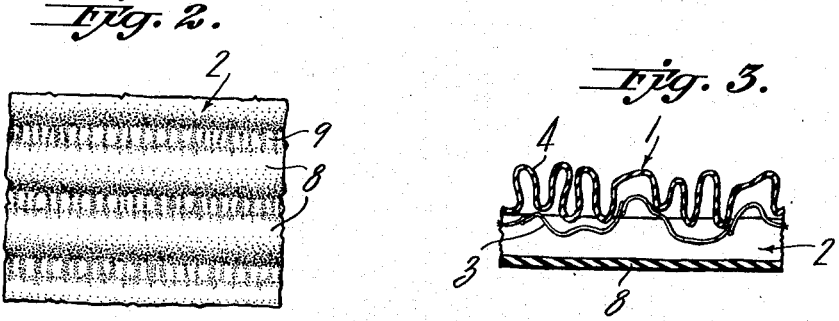
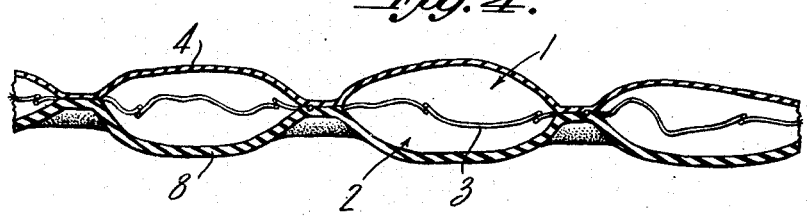
INVENTORS
JAMES J. GALLIGAN
FRED O. THORNTON, JR.
BY Walter L. Piper
ATTORNEY Patented Feb. 11, 1936

2,030,746

UNITED STATES PATENT OFFICE 2,030,746

CRINKLED SHEET MATERIAL AND METHOD OF MAKING SAME

James J. Galligan, Providence, R. I., and Fred O. Thornton, Jr., Jackson Heights, N. Y., assignors, by mesne assignments, to United States Rubber Company, New York, N. Y., a corporation of New Jersey Application August 18, 1934, Serial No. 740,526

12 Claims. (Cl. 154—2)

This invention relates to a crinkled sheet material and more particularly to a crinkled sheet rubber material with fabric reinforcement, and to the method of making same.

Crinkled sheet rubber material has recently come into extensive commercial use, more particularly for the making of articles such as bathing suits, caps and shoes, and aprons. The crinkled bathing suits have become very popular because of their lightness, freedom from sagging or stretching when wet, their elasticity and snug fit without binding, their quick drying, and the fact that they can be made in the most brilliant colors. However, all rubber bathing suits, whether of smooth sheet rubber or crinkled rubber are open to one serious objection in that by reason of the light weight or thin gauge rubber employed in making them, they are relatively easily punctured and when punctured tend to develop large rips or tears. This ripping or tearing is in part due to the fact that when plastic rubber is calendered in sheet form, it develops a decided grain in the direction in which it passes through the calendar and articles made from such calendered sheet rubber have greater strength in the direction of the grain than across the grain. When such a calendered sheet is stretched across the grain, particularly if punctured, it readily rips or tears.

An object of the present invention is to provide a stronger and more durable crinkled sheet rubber material.

Another object is to provide a crinkled sheet rubber material which will not readily puncture and which if punctured will not readily tear or rip.

Another object is to provide a crinkled sheet rubber material having an elasic fabric reinforcement enclosed therein.

For a more complete understanding of the invention, reference is had to the accompanying specification and drawing, in which latter:

Figure 1 is a plan view of the sheet material on a greatly enlarged scale, with the upper crinkled rubber sheet partly torn away to show the fabric reinforcement;

Figure 2 is a rear view of the crinkled material shown in Fig. 1;

Figure 3 is a section on the line 3—3 of Fig. 1; and

Figure 4 is a section on the line 4—4 of Fig. 1 but on a still larger scale.

The invention briefly comprises a crinkled rubber material including upper and lower rubber sheets, with an interposed elastic fabric sheet, the rubber sheets being united to opposite sides of the fabric and also to each other through the interstices of the fabric, the points of union being closely spaced over the entire area of the composite sheet, with the crinkles or puckers being disposed between the points of union. It also comprises the method of making the material.

In one manner of forming the material sheets of unvulcanized rubber are passed, while superposed and with an interposed elastic fabric sheet, between rolls which unite the sheets and cause the crinkling to take place. The crinkling rolls may be of the type disclosed in the application of Galligan and Robinson, Serial No. 614,172, filed May 28, 1932, these rolls comprising a smooth roll and a cooperating roll provided with projections which in cooperation with the smooth roll unite the rubber sheets and fabric sheet under pressure, the rolls being rotated at even peripheral speed. The fabric sheet and one of the rubber sheets are placed under tension when passed through the rolls and by the action of the projections of the crinkling roll the unstretched sheet is united to the fabric sheet and the other rubber sheet at the points where the projections bear against the smooth roll. After passing through the rolls the stretched rubber sheet and the fabric are allowed to contract, and since the spaced points at which the unstretched sheet is united to the stretched rubber sheet are thereby brought closer together, the unstretched sheet is caused to crinkle, pucker or otherwise form a rugose surface. The stretched sheet may also buckle up and pucker, apparently by reason of its lateral expansion after release from tension.

It should be understood that while in the preparation of crude rubber by the milling operation, preliminary to calendering it while warm into sheets, its elasticity has been temporarily destroyed to a considerable extent in order to render it plastic enough for compounding and calendering, at the same time the calendered sheet, when it has cooled, recovers sufficient elasticity to enable it to be stretched to some extent and to then contract when the tension is released. Therefore, when carrying out the above described crinkling operation care should be taken, in stretching the unvulcanized sheet of rubber, not to unduly extend it, and preferably the sheet which is to be stretched is made of heavier gauge rubber than the unstretched sheet, for example, the sheet which is to be stretched may be .010 inch gauge while the sheet which is unstretched may be .006 inche gauge. The relative thickness may be varied to a considerable extent depending upon the character of the rubber stock, the amount of crinkling which it is desired to obtain and other variables.

The projections on the crinkling roll may also be varied in shape, size and spacing in order to vary the crinkling effect, which latter will also be varied in accordance with the tension or stretch imparted to the stretched stock. If the roll is provided with circumferential closely spaced narrow ridges, the general effect obtained is that on the rubber sheet which was unstretched the puckers or crinkles will be short, laterally directed, and arranged in closely spaced longitudinal rows with the points of union with the other sheet disposed between the rows. These short lateral crinkles vary in shape, height, width and to some extent also in length. The sheet which was stretched under such conditions will appear to have long and continuous puckers which may vary somewhat in width and height but which are in general parallel and closely spaced, with the points of union with the other sheet disposed between the longitudinal puckers. By varying the character of the projections and their spacing, widely varying puckered effects can be obtained. For instance, the projections on the crinkling roll instead of being in the form of circumferential ribs may be in the form of spaced circumferential dashes or dots, or they may assume various other forms depending upon the crinkle design which it is desired to obtain. Even with the use of the circumferential continuous ribs, the area of union between the rubber sheets formed by each rib on the crinkling roll is not in the form of a narrow continuous band but instead the joined area appears in the form of small crinkles extending laterally across the narrow joined band.

In the drawing there is shown one embodiment of the invention in which the crinkling roll used was provided with closely spaced projections in the form of circumferential continuous ribs. In the drawing the numeral 1 designates the rubber sheet which was unstretched during the crinkling operation, 2 designates the rubber sheet which was stretched during the crinkling operation, and 3 the interposed fabric sheet. While any suitable elastic fabric may be employed, it is preferred to use a knit fabric such as the stockinette widely employed in footwear linings, but knit with a very open mesh, and preferably laid in with its wales running longitudinally of the lines of adhesion. In the plan view shown in Fig. 1, with the sheet 1 partly torn away, the knit fabric 3 appears to be more or less evenly arranged. However there is difficulty in reproducing in a drawing the actual appearance of the relaxed knit fabric while disposed between the rubber sheets, since this fabric does not lie in a plane but tends to extend up into the crinkles in the rubber sheets, as shown in Figs. 3 and 4, this being due to the fact that the knit fabric was in a stretched condition when united to the two rubber sheets and therefore when the stretched rubber sheet contracts the knit fabric also contracts and hence in the finished sheet material is no longer disposed in a plane. It will be noted in the form shown in Fig. 1, that the unstretched sheet 1, as before stated, is crinkled or puckered in longitudinal rows of small laterally directed crinkles 4, and these crinkles vary in general shape, width, height and length. The variation in length is not so noticeable as the variation in shape, height and width, but some of the crinkles do not extend all the way between adjacent lines of adhesion of the rubber sheets as shown at 5, while other crinkles 6 may extend across two adjacent rows of crinkles, and in some cases a crinkle which is unitary in one row may branch into two crinkles in an adjacent row, as shown at 7. The variation of the crinkles in shape and dimensions is almost infinite, and yet the crinkles as a whole are more or less regularly disposed in rows. The whole effect might be termed that of an irregular regularity.

The stretched sheet 2 is puckered into long, continuous crinkles 8 in parallel relation, these crinkles varying somewhat in width and height but not to the extent of the sheet 1. Along the narrow areas 9 where the sheets were pressed together the rubber forms small transverse crinkles as shown in Fig. 2.

After the crinkling operation, the composite crinkled sheet may then be vulcanized to permanently set it in its crinkled condition. This may be accomplished by treating the sheet material with sulphur chloride either in dilute solution or in vaporized form, preferably the latter, in the usual manner well known to those skilled in the rubber art. However, if desired, the rubber may be compounded with vulcanizing ingredients including a high powered accelerator and vulcanized at low temperatures or ordinary room temperatures. Instead of vulcanizing the sheet material, it may be cut up and formed into articles while still unvulcanized and the completed article then vulcanized by any one of the usual methods. This may be advantageous because when articles are made up from the unvulcanized rubber parts they may be united by pressure due to the tackiness of the material, and the use of cement be thus avoided. Another advantage is that any scrap produced in cutting, being unvulcanized, may be re-used.

While it has been found that under the pressure of the crinkling rolls sufficient adhesion is obtained between the unvulcanized rubber sheets and the interposed fabric sheet, which adhesion is increased by the vulcanizing operation, if desired a cement or latex may be applied to one or both rubber sheets, or to the elastic fabric, or to all of them and then allowed to dry before the crinkling operation. Also the rubber sheets may, if desired, be in a partially unvulcanized condition, provided that the vulcanization has not been carried to a point sufficient to reduce the tackiness of the rubber so that the sheets will no longer adhere, and cement or latex may also be used to assist in obtaining a good union. Also, rubber sheets which have been vulcanized to a greater degree may be employed, provided cement or latex is applied to either the sheets or the elastic fabric or both.

By the invention there is produced a sheet material having a crinkled, puckered or other rugose appearance. The appearance is highly ornamental and gives to some extent the effect of a rough fabric. It also eliminates to a considerable extent the rubbery feel of ordinary sheet rubber. The interposed elastic fabric is so light in weight that the increase in weight of the reinforced crinkled material is negligible. The use of the fabric provides a crinkled material which does not easily puncture, and if punctured the tendency to rip or tear is practically eliminated, and in general increases the strength and durability of the crinkled stock.

In addition to its use for bathing garments, the material is suitable for other beach articles such as shoes, belts, bags, etc., and also for aprons, baby pants, table covers, and other purposes which will be obvious.

While a specific embodiment of the invention has been shown and described, it is obvious that it may be varied and it is not desired to limit it otherwise than as set forth in the appended claims.

Having thus described our invention, what we claim and desire to protect by Letters Patent is:—

1. An elastic crinkled sheet material comprising an intermediate fabric stretchable in all directions, and outer plies of rubber-like material adhered at small, closely spaced areas to the surfaces thereof, at least one of said plies being crinkled.

2. An elastic sheet material comprising a loosely fabricated and stretchable intermediate sheet including fibrous material, and outer plies of rugose rubber-like material adhered at small, closely spaced areas to the surfaces thereof.

3. A elastic sheet material comprising a loosely knit fabric, and outer plies of rugose rubber-like material adhered at small, closely spaced areas to the surfaces thereof.

4. An elastic sheet material comprising a loosely knit fabric in a relaxed condition, and sheets of rubber having small, closely spaced raised and depressed portions over their entire areas and united to opposite sides of said fabric at at least some of said depressed portions.

5. An elastic sheet material comprising a loosely knit fabric in a relaxed condition, and sheets of rubber on opposite sides of said fabric and having closely spaced raised and depressed portions over their entire areas, each sheet being united to the fabric at at least some of said depressed portions, the projections on one sheet being relatively short and substantially regularly disposed but differing individually in shape, height, length and width, and the projections on the other sheet being continuous but varying in height and width.

6. An elastic sheet material comprising a fibrous sheet stretchable in all directions, and sheets of rubber secured to opposite sides thereof on closely spaced small areas, the portions of said sheets intermediate said secured areas being formed into projections having underlying air pockets.

7. An elastic sheet material comprising an open mesh knit fabric in a relaxed condition, a sheet of rubber disposed on each side thereof, said sheets being united to said fabric and to each other through the fabric meshes along a plurality of narrow closely spaced areas extending in the direction of the fabric wales, and the portions of the sheets between said united areas being formed into projections having underlying air pockets.

8. An elastic sheet material comprising a light weight open mesh knit fabric in a relaxed condition, a sheet of rubber disposed on each side thereof, one of said sheets being of heavier gauge than the other, said sheets being united to said fabric and to each other through the fabric meshes along closely spaced parallel narrow areas extending in the direction of the fabric wales, the unconnected areas of the lighter gauge sheet being formed into longitudinal rows of short transverse irregular puckers, and the unconnected areas of the heavier gauge sheet being formed into longitudinally directed continuous puckers.

9. An elastic sheet material comprising an intermediate fabric sheet including fibrous material and stretchable in all directions, a rubber sheet on one side thereof and having recurring series of small closely spaced puckers, and a second rubber sheet on the opposite side of said fabric and having closely spaced puckers, all of said sheets being united.

10. An elastic sheet material comprising an intermediate loosely knit sheet including fibrous material, a rubber sheet on one side thereof and having closely spaced rows of small, closely spaced irregular puckers, and a second rubber sheet on the opposite side of said fabric and having closed spaced puckers, all of said sheets being united at points between said puckers.

11. The method of making an elastic sheet material which comprises superposing sheets of rubber-like material with an interposed sheet of elastic fabric, uniting all of said sheets over a plurality of closely spaced small areas while one of said rubber-like sheets and the fabric sheet are under tension and stretched, and releasing the tension to thereby permit the fabric to contract and the unconnected areas of the rubber-like sheets to pucker.

12. The method of making an elastic sheet material which comprises superposing sheets of rubber-like material with an interposed sheet of open mesh knit fabric, placing one of said rubber-like sheets under tension and said knit fabric under tension in the direction of its wales, uniting all of said sheets by pressure on closely spaced small areas, and releasing the tension to thereby permit the rubber-like sheets to pucker and the knit fabric to relax.

JAMES J. GALLIGAN.
FRED O. THORNTON, Jr.